United States Patent
Yamada

(10) Patent No.: US 6,907,077 B2
(45) Date of Patent: Jun. 14, 2005

(54) VARIABLE RESOLUTION DECODER

(75) Inventor: Toru Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 675 days.

(21) Appl. No.: 09/911,309

(22) Filed: Jul. 23, 2001

(65) Prior Publication Data

US 2002/0037045 A1 Mar. 28, 2002

(30) Foreign Application Priority Data

Sep. 28, 2000 (JP) ........................................ 2000-296434

(51) Int. Cl.[7] .............................................. H04N 7/18
(52) U.S. Cl. ............................ 375/240.21; 375/240.18
(58) Field of Search .......................... 375/240.12–240.29

(56) References Cited

U.S. PATENT DOCUMENTS

| | | | | |
|---|---|---|---|---|
| 5,412,428 A | * | 5/1995 | Tahara ................... | 375/240.25 |
| 5,485,279 A | * | 1/1996 | Yonemitsu et al. .... | 375/240.14 |
| 6,266,091 B1 | * | 7/2001 | Saha et al. ............. | 375/240.16 |
| 6,563,876 B2 | * | 5/2003 | Boyce et al. .......... | 375/240.15 |
| 6,608,867 B2 | * | 8/2003 | Zhong et al. ........... | 375/240.2 |
| 6,628,714 B1 | * | 9/2003 | Fimoff et al. .......... | 375/240.16 |
| 6,647,061 B1 | * | 11/2003 | Panusopone et al. .. | 375/240.12 |
| 6,650,707 B2 | * | 11/2003 | Youn et al. ............. | 375/240.12 |
| 6,665,344 B1 | * | 12/2003 | Fimoff ..................... | 375/240.2 |
| 6,748,018 B2 | * | 6/2004 | Sato et al. .............. | 375/240.21 |

FOREIGN PATENT DOCUMENTS

| | | |
|---|---|---|
| JP | 6-343163 | 12/1994 |
| JP | 11-262011 | 9/1999 |
| JP | 2000-41253 | 2/2000 |
| JP | 2000-41261 | 2/2000 |
| JP | 2000-50274 | 2/2000 |
| JP | 2000-59793 | 2/2000 |
| JP | 2000-175195 | 6/2000 |

OTHER PUBLICATIONS

"A Drift Free Scalable Decoder" Iwahashi et al., The Institute of Electronics, Information and Communication Engineers, Technical Report of IEICE, CS94–186, DSP94–108 (Jan., 1995).
Copy of Japanese Office Action dated Apr. 14, 2004 (and English translation of relevant portion).

* cited by examiner

Primary Examiner—Andy Rao
(74) Attorney, Agent, or Firm—Dickstein, Shapiro, Morin & Oshinsky, LLP

(57) ABSTRACT

A variable resolution decoder of the present invention decodes image data compressed with a compression method such as MPEG-2 supporting interlaced scanning. The decoder performs variable decoding and inverse quantization on the compressed image data and then checks a DCT mode of a frame, performs inverse discrete cosine transform in 4 by 8 pixels when the mode is a DCT mode, acquires image data of full resolution for interlaced scanning in a vertical direction, and thins the image data, thereby performing image reduction of the image data during decoding with field information maintained. The decoder comprises means for performing reduction in a DCT area for resolution of image data in a horizontal direction and means for performing reduction in a pixel area for resolution of image data in a vertical direction.

8 Claims, 6 Drawing Sheets

VARIABLE RESOLUTION DECODER

BACKGROUND OF THE INVENTION

1. Field of the Invention:

The present invention relates to a decoder for decoding image data compressed with a compression method such as MPEG-2 supporting interlaced scanning, and more particularly to a variable resolution decoder for decoding image data such that the image data has lowered resolution at the time of display.

2. Description of the Related Art

In reproducing image data compressed with a compression method such as MPEG-2 which is known as a standard for realizing functions of compression and decompression of moving images and voice in real time, the image data is displayed on a display with resolution different from the size of the image data in some cases.

An example of such cases is when an image from an HDTV (High Definition Television) is output on a typical TV monitor or when image data is displayed on a monitor of a personal computer (hereinafter referred to as "PC"). In such a case, it is common practice to completely decode image data and then reduce the image data at the time of display, in which case detailed portions of the image (high-frequency components) are lost through the reduction processing. For this reason, image data is decoded with its high-frequency components removed in advance and the image data is reduced at the time of decoding, thereby improving reproduction performance. When image data is decoded with software on a PC, reproduction of image data of resolution lowered during decoding can lighten load on its CPU required for decoding the image data even when the CPU has low performance.

A decoder which lowers resolution of image data during decoding to output the reduced image data has been proposed in a document "Scalable decoder with no low-frequency drift" (Iwahashi, Kambayashi, and Kiya: Technical Report of IEICE DSP94-108 1995-01). FIG. 1 shows the decoder. For decoding compressed image data, only low-frequency components of discrete cosine transformed (hereinafter abbreviated as "DCT") blocks are used to perform inverse discrete cosine transform (hereinafter abbreviated as "IDCT") on 4 by 4 pixel blocks for lowering resolution. Motion compensation is performed by reducing values of decoded motion vectors to half with quarter image accuracy.

In the method, however, field information of image data of alternate lines is lost by reduction processing in a vertical direction in interlaced scanning. Thus, a problem occurs that field prediction employed in MPEG-2 or the like is not accurately made.

To solve the problem, Japanese Patent Laid-open Publication No. 2000-059793 proposes a method in which IDCT is performed in different manners for a field DCT mode and a frame DCT mode. In the method, for the frame DCT mode in which a top field and a bottom field are subjected together to DCT, image data is separated into two fields by once performing IDCT, field DCT is applied to each field, and only low-frequency components thereof are used to perform IDCT, thereby achieving reduction processing with field information maintained. The method involves an increased amount of operations and thus is not suitable for a field requiring high processing performance such as decoding of image data with software on a PC. It can be said that the method is not appropriate at all for a case in which display resolution is lowered in order to improve reproduction performance.

SUMMARY OF THE INVENTION

It is an object of the present invention to provide a variable resolution decoder for obtaining reduced image data with its field information maintained at fast speed and with a simple configuration.

A variable resolution decoder of the present invention decodes image data compressed with a compression method such as MPEG-2 supporting interlaced scanning, and includes means for performing variable length decoding and inverse quantization on the compressed image data, means for checking a discrete cosine transform mode of a frame and performing inverse discrete cosine transform in 4 by 8 pixels when the mode is a discrete cosine transform mode, and means for acquiring image data of full resolution for interlaced scanning in a vertical direction and thinning interlaced scanned image data to perform image reduction processing during decoding with field information maintained.

According to another aspect, a variable resolution decoder of the present invention decodes image data compressed with a compression method such as MPEG-2 supporting interlaced scanning, and includes means for performing variable length decoding and inverse quantization on the compressed image data, means for checking a discrete cosine transform mode of a frame and performing reduction processing in a discrete cosine transform area for resolution of interlaced scanning in a horizontal direction, and means for performing reduction processing in a pixel area for resolution of interlaced scanning in a vertical direction.

The means for performing reduction processing in the discrete cosine transform area is field inverse discrete cosine transform processing means for performing inverse discrete cosine transform processing in a field discrete cosine transform mode, and the means for performing reduction processing in the pixel area is frame inverse discrete cosine transform processing means for performing inverse discrete cosine transform processing in a frame discrete cosine transform mode.

According to another aspect, a variable resolution decoder of the present invention decodes image data compressed with a compression method such as MPEG-2 supporting interlaced scanning, and includes means for performing variable length decoding and inverse quantization on the compressed image data, means for selecting a discrete cosine transform mode, means for checking a discrete cosine transform mode of a frame and performing inverse discrete cosine transform in 4 by 8 pixels when the mode is a frame discrete cosine transform mode, and means for acquiring image data of full resolution for interlaced scanning in a vertical direction and thinning interlaced scanned image data, wherein the image data is decoded such that the image has lowered resolution at the time of display.

According to another aspect, a variable resolution decoder of the present invention decodes image data compressed with a compression method such as MPEG-2 supporting interlaced scanning, and includes means for performing variable length decoding and inverse quantization on the compressed image data, means for checking a discrete cosine transform mode of a frame and performing inverse discrete cosine transform in 4 by 8 pixels when the mode is a discrete cosine transform mode, and means for acquiring image data of full resolution for interlaced scanning in a vertical direction and thinning interlaced scanned image data, wherein the image data is decoded such that the image has lowered resolution at the time of display.

The means for thinning image data takes only even-numbered lines of the interlaced scanned image data and calculates the averages of two adjacent taken lines which are used as data of top field, and takes only odd-numbers lines of the interlaced scanned image data and calculates the averages of two adjacent taken lines which are used as data of bottom field to decode the image data at halved resolution both vertically and horizontally with field information maintained.

The present invention includes means for decoding image data compressed with a compression method such as MPEG-2 supporting interlaced scanning such that the image has lowered resolution at the time of display by performing IDCT in 4 by 8 pixels in a frame DCT mode and acquiring image data of full resolution before thinning of the image in a vertical direction.

In FIG. 2, a variable resolution decoder of the present invention comprises storage device 1 for storing compressed original image 11, image data processor 2 for decoding image data loaded from storage device 1, and display 3 for displaying the decoded image data.

When compressed image data is decoded with lowered resolution (downscale decoding), simple IDCT with a lower order results in loss of field information, and thus field prediction employed in a compression method is not performed accurately. To address the problem, according to the present invention, IDCT is performed in different manners for a field DCT mode and a frame DCT mode which are employed in a compression method to enable lowered resolution with field information maintained. The compression method herein refers to already standardized one such as MPEG 2.

Since the method of the present invention can decode image data without requiring complicated processing, it is effective particularly for decoding of image data by software.

A first effect of the present invention is the ability to realize downscale decoding with no degradation of picture quality.

This is because different processing is performed depending on DCT modes to enable lowered resolution with field information maintained.

A second effect of the present invention is the ability to realize downscale decoding at fast speed.

This is because the decoding process does not rely on IDCT in 8 by 8 pixels which involves a large amount of operations.

DESCRIPTION OF THE PREFERRED EMBODIMENTS

Next, preferred embodiments of the present invention are described in detail with reference to the drawings.

Figure 1:
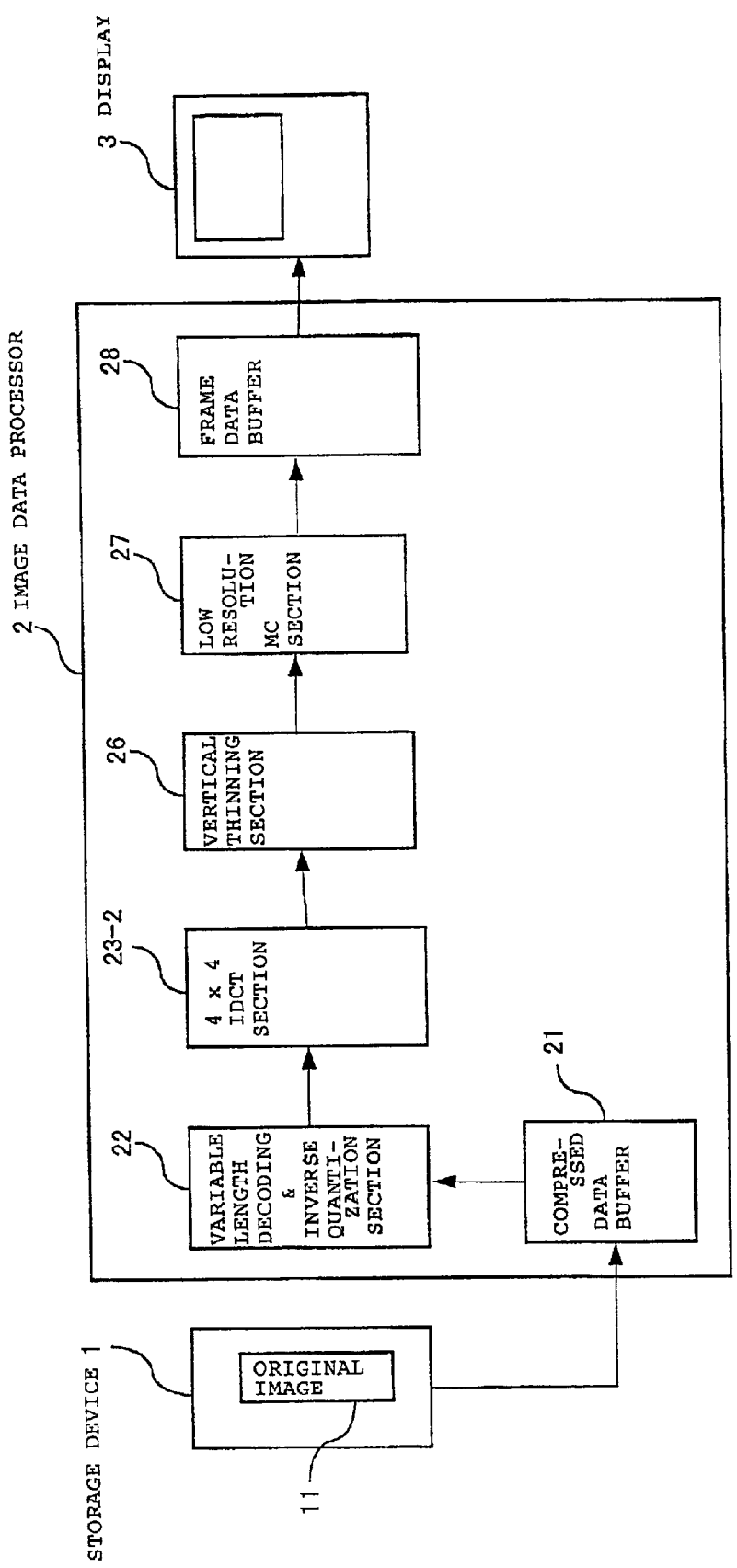
FIG. 1 is a block diagram showing a configuration of a prior art.
Figure 2:
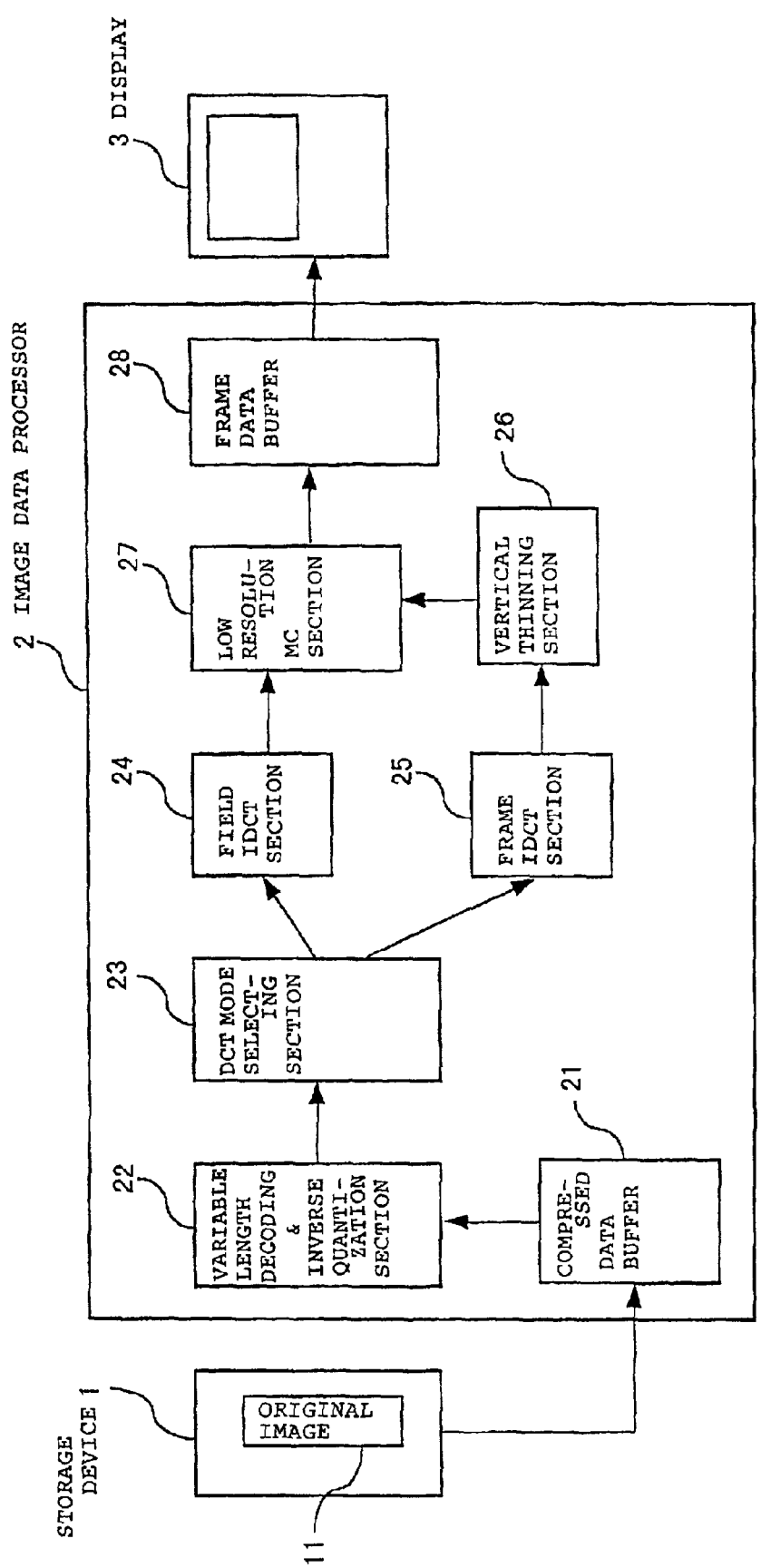
FIG. 2 is a block diagram showing a configuration of a first embodiment of the present invention.

Referring to FIG. 2, a configuration of a first embodiment comprises storage device 1 for storing compressed image data, image data processor 2 operating under control of a program, and display 3 for displaying image data.

Storage device 1 includes original image 11 compressed with a compression method such as MPEG-2 supporting interlaced scanning.

Image data processor 2 comprises compressed data buffer 21 for holding image data loaded from storage device 1, variable length decoding and inverse quantization section 22 for performing variable length decoding and inverse quantization which is a first step of decoding, DCT mode selecting section 23 for selecting a DCT mode, field IDCT section 24 for performing IDCT in a field DCT mode, frame IDCT section 25 for performing IDCT in a frame DCT mode, vertical thinning section 26 for performing thinning for interlaced scanning in a vertical direction in the frame DCT mode, low resolution MC section 27 for performing motion compensation on image data of lowered resolution, and frame data buffer 28 for storing image data to be displayed.

Image data decoded in image data processor 2 is displayed by display 3.

Next, the operation in the embodiment is described in detail with reference to FIGS. 2 to 6.

In FIG. 2, storage device 1 stores original image 11 compressed with a compression method such as MPEG-2 supporting interlaced scanning.

For decoding the compressed image data, compressed original image 11 is first loaded into compressed data buffer 21. Original image 11 is assumed to be compressed with a compression method such as MPEG-2 supporting interlaced scanning, and the decoding of the image data is performed through a procedure of variable length decoding, inverse quantization, IDCT, and motion compensation. At a first step of the decoding, variable length decoding and inverse quantization section 22 performs variable length decoding and inverse quantization on the data of original image 11. The result of the inverse quantization is discrete cosine transformed data in 8 by 8 pixel blocks.

Figure 3:
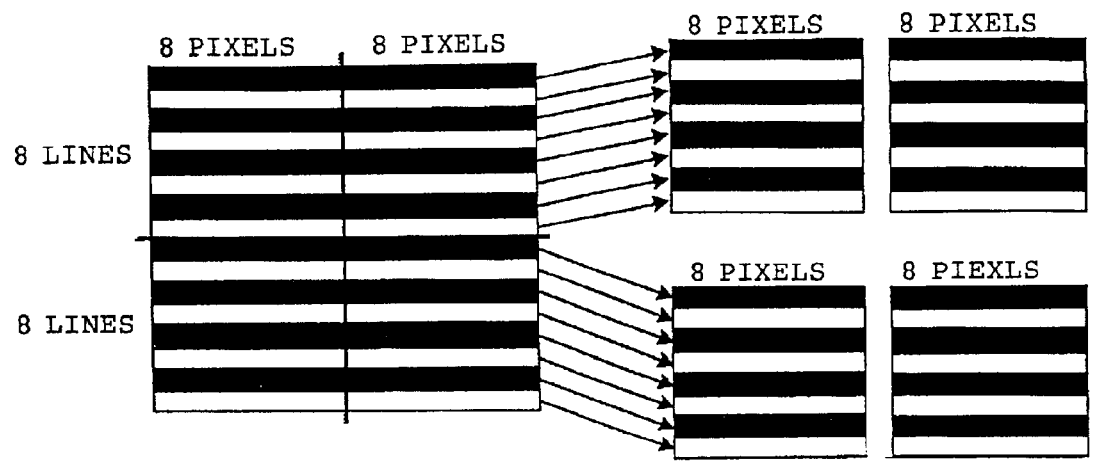
FIG. 3 illustrates a frame DCT mode in which DCT is performed with 8 by 8 pixels.
Figure 4:
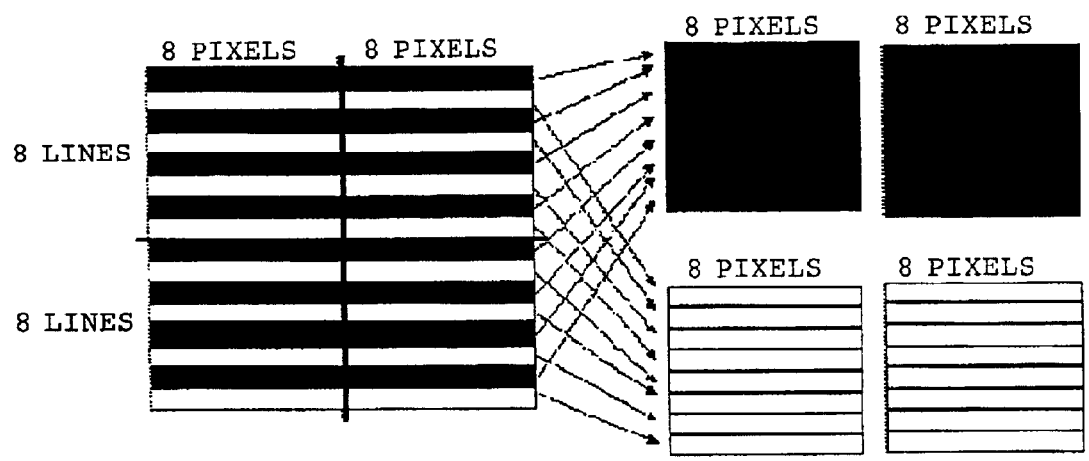
FIG. 4 illustrates a field DCT mode in which DCT is performed on each field obtained by arranging alternate lines in a macro block of 16 by 16 pixels.

A frame DCT mode refers to a mode in which DCT is performed using 8 by 8 pixels in a frame with no change as shown in FIG. 3. On the other hand, a field DCT mode refers to a mode in which DCT is performed on each field obtained by arranging alternate lines in a macro block of 16 by 16 pixels as shown in FIG. 4.

Figure 5:
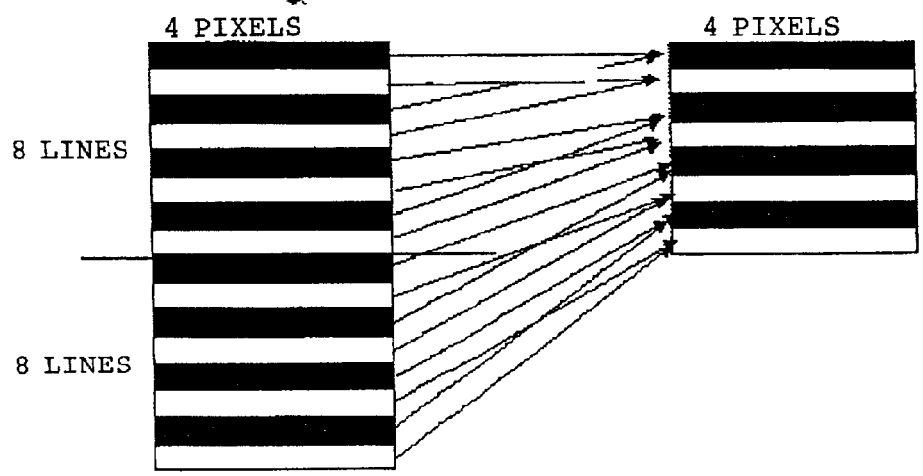
FIG. 5 illustrates IDCT performed with 4 by 8 pixels and thinning to half in a vertical direction for lowering resolution.

For lowering resolution of image data at the decoding, IDCT is typically performed with a lower order than DCT in 8 by 8 pixels performed at the time of coding. For example, when resolution is reduced to half both horizontally and vertically, IDCT is performed in 4 by 4 pixels. In the frame DCT mode, however, the IDCT in 4 by 4 pixels results in loss of field information. In this case, motion compensation after the IDCT is not performed accurately and thus accurate decoding results cannot be obtained. For this reason, DCT mode selecting section 23 detects the DCT mode of an image to perform processing in the frame DCT mode different from processing in the field DCT mode. In the field DCT mode, since data of a block is configured for each field, field IDCT section 24 performs IDCT in 4 by 4 pixels to lower resolution. In the frame DCT mode, IDCT is performed to lower resolution only in the horizontal direction irrelevant to fields. Specifically, frame IDCT section 25 performs IDCT in 4 by 8 pixels. Then, vertical thinning section 26 thins the lines in the vertical direction to half to lower resolution. The thinning is performed as shown in FIG. 5 by taking only even-numbered lines and then calculating the averages of two adjacent taken lines which are used as data of a top field. Also, only odd-numbers lines are taken, and the averages of two adjacent taken lines are calculated and used as data of a bottom field. In this manner, the image data is decoded at halved resolution both vertically and horizontally with its field information maintained. Motion compensation is performed in low resolution MC section 27 with halved motion vectors and quarter pixel accuracy.

The decoding result is stored in frame data buffer 28 and then displayed by display 3.

Figure 6:
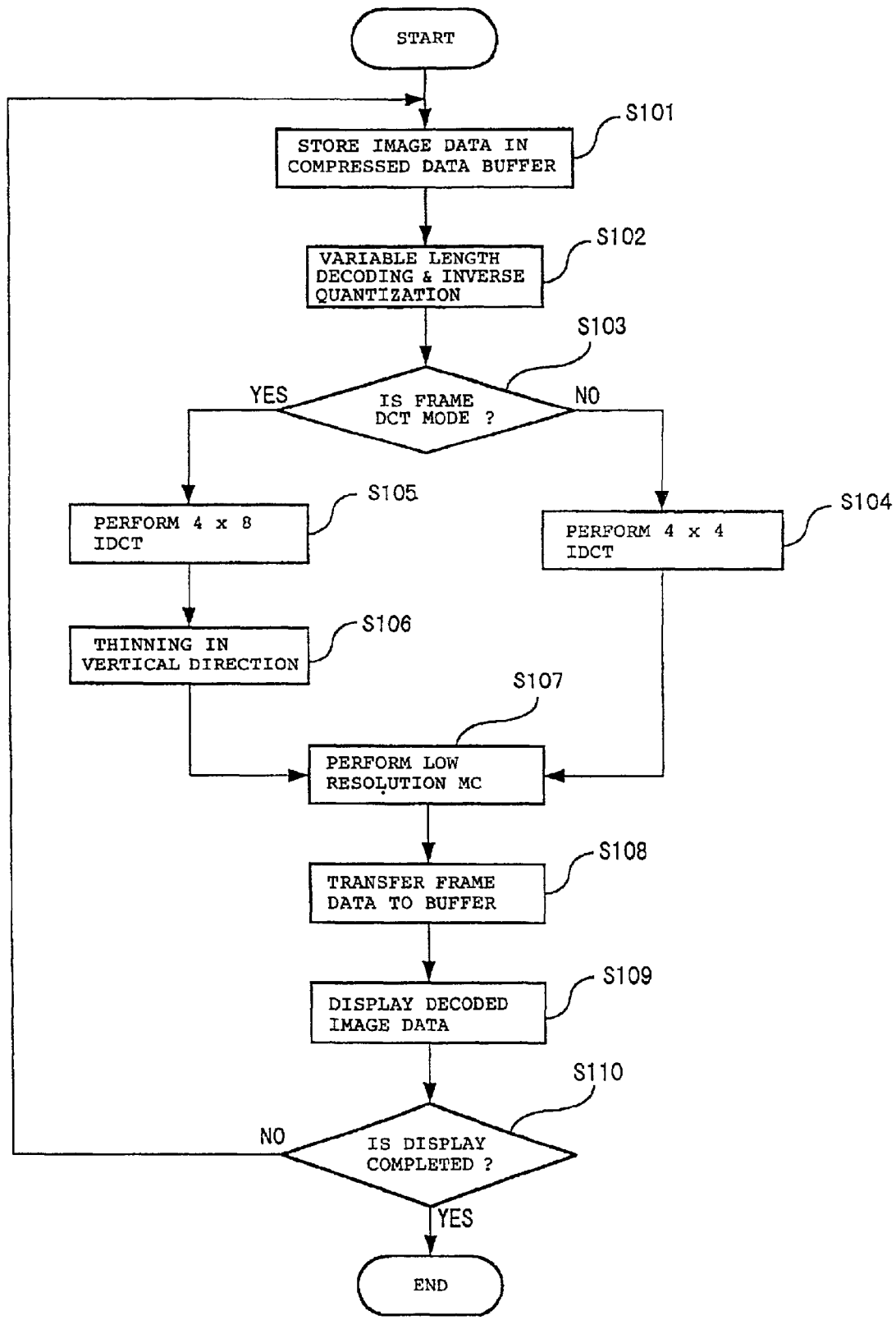
FIG. 6 is a flow chart illustrating the operation of the first embodiment of the present invention.

FIG. 6 is a flow chart illustrating the processing for the moving image reproduction described in FIG. 2. The flow of the processing is as follows:

Decoding is started.

Original image 11 in FIG. 2 is transferred to compressed data buffer 21 to store image data therein (S101).

Variable length decoding and inverse quantization section 22 performs variable length decoding and inverse quantization on the data (S102).

DCT mode selecting section 23 checks the DCT mode of a frame (S103).

When the frame is in the field DCT mode, field IDCT section 24 performs IDCT in 4 by 4 pixels and the processing continues to S107 (S104).

When the frame is in the frame DCT mode, frame IDCT section 25 performs IDCT in 4 by 8 pixels (S105).

Vertical thinning section 26 lowers resolution in the vertical direction (S106).

Low resolution MC section 27 performs motion compensation (S107).

The image data for which decoding has been completed is stored in frame buffer 28 (S108).

The decoded image is displayed by display 3 (S109).

When display is not completed, the processing returns to S101 for decoding data of the next picture (S110).

When display is completed, the processing is terminated.

Next, another embodiment of the present invention is described.

In the method of the present invention, resolution is lowered in different manners depending on DCT modes. In the method, a difference may occur between the field DCT mode and the frame DCT mode in position information of pixel data on space after the lowering of resolution, and the difference may serve as an error to affect picture quality. To avoid this, resolution is lowered in the field DCT mode in the same manner as the frame DCT mode to eliminate the difference in position information, thereby making it possible to suppress degradation of picture quality. Since resolution is lowered in different manners for the vertical direction and horizontal direction in this case similarly to the first embodiment, the lowered resolution can be achieved with field information maintained to obtain accurate image of low resolution.

Figure 7:
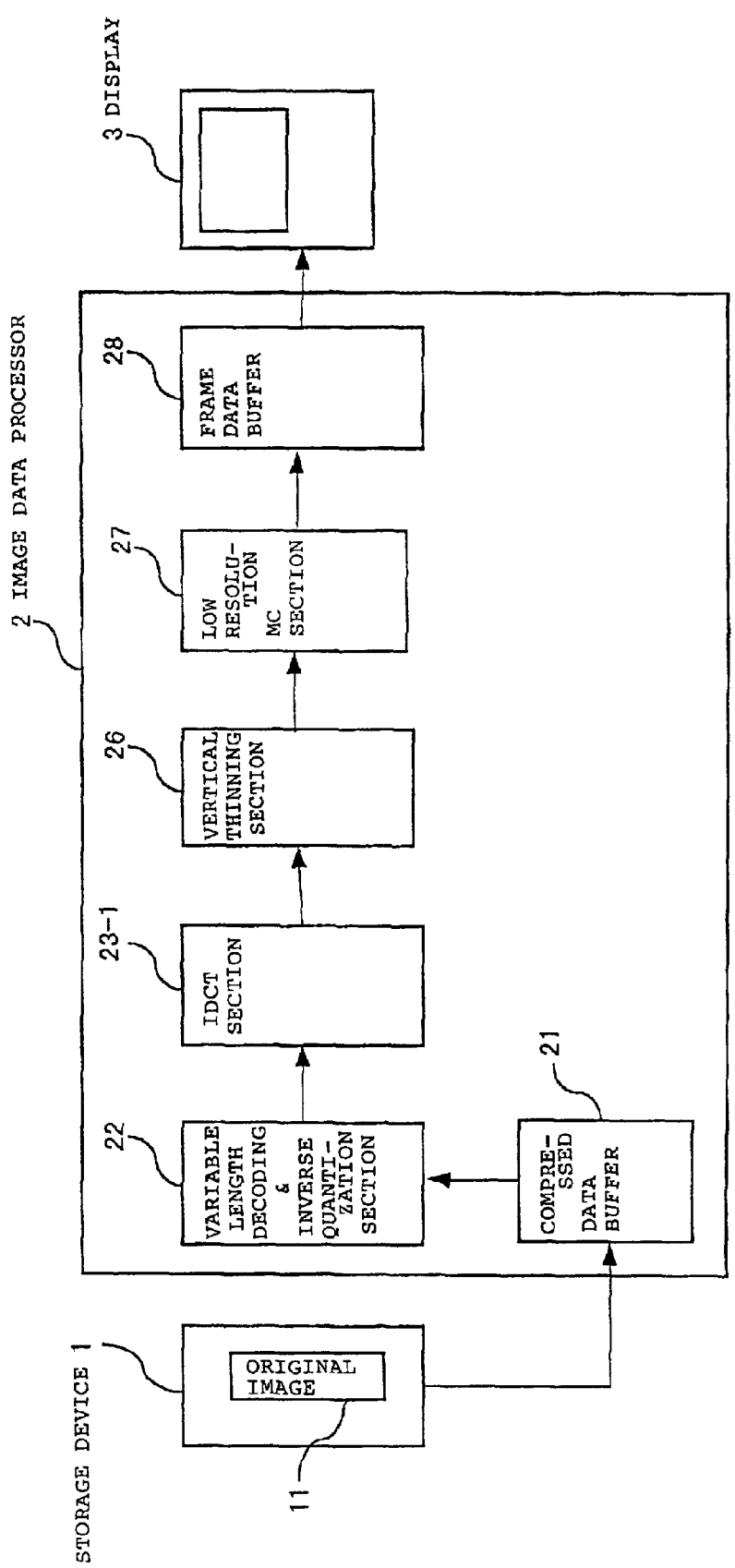
FIG. 7 is a block diagram showing a configuration of a second embodiment of the present invention.

A configuration of the embodiment is as shown in FIG. 7. FIG. 7 comprises, as in FIG. 2, storage device 1 for storing compressed image data, image data processor 2 operating under control of a program, and display 3 for displaying image data. Storage device 1 stores original image 11 compressed with a compression method such as MPEG-2 supporting interlaced scanning. For reproducing the compressed image, the image data is first loaded into compressed data buffer 21. Next, as a first step for decoding, variable length decoding and inverse quantization section 22 performs variable length decoding and inverse quantization on the data of original image 11. The result of the inverse quantization is cosine transformed data in 8 by 8 pixel blocks. The IDCT is performed in the same manner both in the frame DCT mode and the field DCT mode. To prevent loss of field information, the IDCT is performed in the aforementioned manner employed in the frame DCT mode in the first embodiment (that is, the IDCT in 4 by 8 pixels performed before thinning in the vertical direction). IDCT section 23-1 performs IDCT in 4 by 8 pixels. Then, vertical thinning section 26 thins the lines to half vertically to lower resolution. In this manner, decoding is performed at the resolution halved vertically and horizontally with the field information maintained. Low resolution MC section 27 performs motion compensation. The decoding result is stored in frame data buffer 28 and displayed by display 3.

In this manner, resolution is lowered in different manners for the vertical direction and horizontal direction to enable lowered resolution with field information maintained. Since IDCT in 8 by 8 pixels is not employed, decoding performance can be improved.

Figure 8:
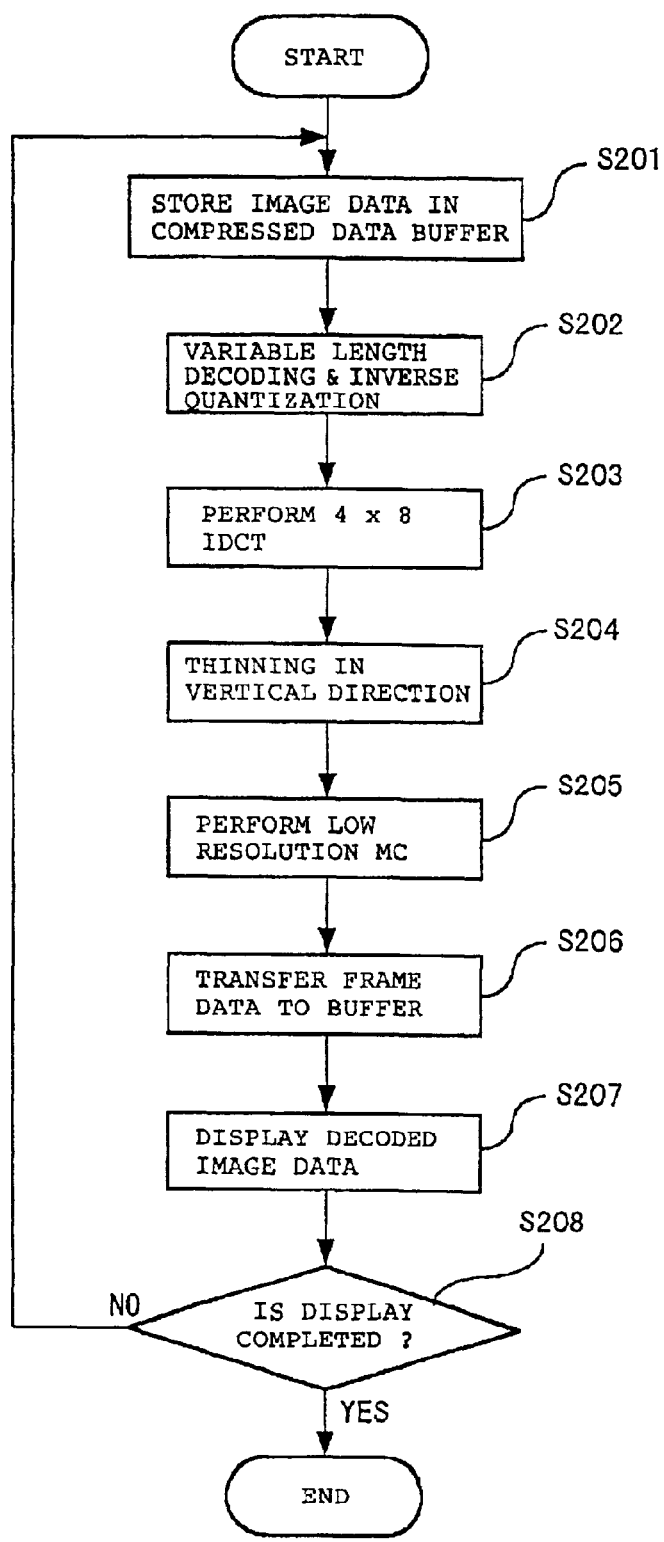
FIG. 8 is a flow chart illustrating the operation of the second embodiment of the present invention.

FIG. 8 is a flow chart illustrating the processing for the reduced display described in FIG. 7. The flow of the processing is as follows:

Decoding is started.

Original image 11 in FIG. 7 is transferred to compressed data buffer 21 to store image data therein (S201).

Variable length decoding and inverse quantization section 22 performs variable length decoding and inverse quantization on the data (S202).

IDCT section 23-1 performs IDCT in 4 by 8 pixels (S203).

Vertical thinning section 26 lowers resolution in the vertical direction (S204).

Low resolution MC section 27 performs motion compensation (S205).

The image data for which decoding has been completed is stored in frame buffer 28 (S206).

The decoded image is displayed by display 3 (S207).

When display is not completed, the processing returns to S201 for decoding data of the next picture (S208).

When display is completed, the processing is terminated.

What is claimed is:

1. A variable resolution decoder for decoding image data compressed with a compression method such as MPEG-2, said decoder comprising:
   means for performing variable length decoding and inverse quantization on the compressed image data;
   means for checking a discrete cosine transform mode of a frame and performing inverse discrete cosine transform in 4 by 8 pixels when the mode is a discrete cosine transform mode; and means for acquiring image data of full resolution for interlaced scanning in a vertical direction and thinning interlaced scanned image data to perform image reduction processing during decoding with field information maintained.

2. A variable resolution decoder for decoding image data compressed with a compression method such as MPEG-2, said decoder comprising:

means for performing variable length decoding and inverse quantization on the compressed image data;

means for checking a discrete cosine transform mode of a frame and performing reduction processing in a discrete cosine transform area for resolution of interlaced scanning in a horizontal direction; and means for performing reduction processing in a pixel area for resolution of interlaced scanning in a vertical direction wherein, the reduction in vertical resolution is performed using even or odd lines in a top field and the other line in a bottom field.

3. The variable resolution decoder according to claim 2, wherein said means for performing reduction processing in said discrete cosine transform area is field inverse discrete cosine transform processing means for performing inverse discrete cosine transform processing in a field discrete cosine transform mode.

4. The variable resolution decoder according to claim 2, wherein said means for performing reduction processing in said pixel area is frame inverse discrete cosine transform processing means for performing inverse discrete cosine transform processing in a frame discrete cosine transform mode.

5. A variable resolution decoder for decoding image data compressed with a compression method such as MPEG-2, said decoder comprising:

means for performing variable length decoding and inverse quantization on the compressed image data;

means for selecting a discrete cosine transform mode;

means for checking a discrete cosine transform mode of a frame and performing inverse discrete cosine transform in 4 by 8 pixels when the mode is a frame discrete cosine transform mode; and means for acquiring image data of full resolution for interlaced scanning in a vertical direction and thinning interlaced scanned image data, wherein the image data is decoded such that the image has lowered resolution at the time of display.

6. A variable resolution decoder for decoding image data compressed with a compression method such as MPEG-2, said decoder comprising:

means for performing variable length decoding and inverse quantization on the compressed image data;

means for checking a discrete cosine transform mode of a frame and performing inverse discrete cosine transform in 4 by 8 pixels when the mode is a discrete cosine transform mode; and means for acquiring image data of full resolution for interlaced scanning in a vertical direction and thinning interlaced scanned image data, wherein the image data is decoded such that the image has lowered resolution at the time of display.

7. The variable resolution decoder according to claim 5, wherein said means for thinning image data takes only even-numbered lines of said interlaced scanned image data and calculates the averages of two adjacent taken lines which are used as data of top field, and takes only odd-numbers lines of said interlaced scanned image data and calculates the averages of two adjacent taken lines which are used as data of bottom field to decode the image data at halved resolution both vertically and horizontally with field information maintained.

8. The variable resolution decoder according to claim 6, wherein said means for thinning image data takes only even-numbered lines of said interlaced scanned image data and calculates the averages of two adjacent taken lines which are used as data of top field, and takes only odd-numbers lines of said interlaced scanned image data and calculates the averages of two adjacent taken lines which are used as data of bottom field to decode the image data at halved resolution both vertically and horizontally with field information maintained.

* * * * *